United States Patent
Takahashi

(10) Patent No.: US 6,292,853 B1
(45) Date of Patent: Sep. 18, 2001

(54) DMA CONTROLLER ADAPTED FOR TRANSFERRING DATA IN TWO-DIMENSIONAL MAPPED ADDRESS SPACE

(75) Inventor: Masafumi Takahashi, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 09/164,614

(22) Filed: Oct. 1, 1998

(30) Foreign Application Priority Data

Oct. 2, 1997 (JP) .................................................... 9-269913

(51) Int. Cl.⁷ ....................................................... G06F 13/14
(52) U.S. Cl. ................................ 710/22; 710/26; 711/202
(58) Field of Search ........................ 710/22, 1–4, 20–23, 710/65, 5, 9, 26–28, 52; 711/202

(56) References Cited

U.S. PATENT DOCUMENTS

| | | | | |
|---|---|---|---|---|
| 5,323,488 | * | 6/1994 | Udagawa | 395/426 |
| 5,553,307 | * | 9/1996 | Fujii et al. | 710/25 |
| 5,561,816 | * | 10/1996 | Mitsuhira et al. | 710/22 |
| 5,596,376 | | 1/1997 | Howe | 347/718 |
| 5,668,938 | * | 9/1997 | Tomory | 358/1.16 |
| 5,758,182 | * | 5/1998 | Rosenthal et al. | 710/3 |
| 5,802,546 | * | 9/1998 | Chisholm et al. | 711/100 |
| 5,963,713 | * | 10/1999 | Inose et al. | 358/1.4 |
| 6,014,731 | * | 1/2000 | Totsuka et al. | 711/202 |
| 6,108,722 | * | 8/2000 | Toreller et al. | 710/26 |

* cited by examiner

Primary Examiner—Thomas Lee
Assistant Examiner—RiJue Mai
(74) Attorney, Agent, or Firm—Hogan & Hartson, L.L.P.

(57) ABSTRACT

A DMA controller having a highly-functional, widely applicable construction, which enables data transfer of a more complicated data region in a single transfer operation, includes an address-continuous transfer end determining portion which determines the end of current data transfer in a region where addresses of data to be transferred are continuous (address-continuous region) contained in an address-continuous region of data to be transferred, and outputs an address-continuous region transfer end signal; an address generating portion which renews and outputs addresses contained in the address-continuous region for transferring data therefrom sequentially from the leading address, and successively effects similar renewal and output of addresses for a plurality of address-continuous regions in response to the address-continuous region transfer end signal; and a data transfer end deciding portion which determines the end of data transfer of a final address-continuous region among all address-continuous regions contained in an address region of data to be transferred, and outputs a data transfer end signal.

3 Claims, 10 Drawing Sheets

COPYING FROM RECTANGULAR REGION
TO CONTINUOUS REGION

COPYING FROM RECTANGULAR REGION
TO RECTANGULAR REGION

DMA CONTROLLER ADAPTED FOR TRANSFERRING DATA IN TWO-DIMENSIONAL MAPPED ADDRESS SPACE

BACKGROUND OF THE INVENTION

This invention relates to a DMA (direct memory access) controller, particularly of a type available for fast dealing with data block transfer between memory modules or elements.

For transferring data by DMA, a transfer circuit (channel) independent from a central processing unit (CPU) is formed, and a DMA controller is used to control it to enable direct exchange of data between different memory modules.

FIG. 1 is a block diagram showing connection between a DMA controller and a plurality of memory modules.

The DMA controller 70 is typically connected to a plurality of memory modules M0, M1, M2, . . . Mn, to transfer data between memory modules by exchanging an address signal, chip enable (CE) signal, read/write (R/W) signal, data read signal and data write signal with memory modules for data transfer.

FIG. 2 is a block diagram showing the construction of the DMA controller.

The DMA controller includes a source address generating circuit 82, target address generating circuit 83, chip enable (CE) signal generating circuit 84, read/write (R/W) signal generating circuit 85, address output circuit 86, data read selecting circuit 87, data holding register for temporarily holding transfer data, and state transition circuit 81 for controlling these circuits.

The state transition circuit 81 is connected to the source address generating circuit 82, target address generating circuit 83, chip enable (CE) signal generating circuit 84, read/write (R/W) signal generating circuit 85, and data read selecting circuit 87, respectively. The source address generating circuit 82 is connected to the state transition circuit 81, chip enable (CE) signal generating circuit 84, address output circuit 86 and data read selecting circuit 87, respectively. The target address generating circuit 83 is connected to the chip ennoble (CE) signal generating circuit 84, read/write (R/W) signal generating circuit 85 and address output circuit 86, respectively. The data read selecting circuit 87 is connected to the data holding register 88. The data holding register 88 is connected to data write ports of all memory modules.

The address output circuit 86 decodes a source address and a target address on the basis of a predetermined address map, and functions as a switch for outputting the source address to the source-side memory and the target address to the target-side memory. It outputs "0", for example, to a memory module which is neither the source nor the target.

The read/write (R/W) signal generating circuit 85 decodes a target address on the basis of the address map, and sets a read/write (R/W) signal to the target-side memory in the write state. At that time, the read/write (R/W) signal to the other memory modules is in the read state. Whether the DMA controller is in operation or not is determined by decoding the state variable from the state transition circuit 81.

The chip enable (CE) signal generating circuit 84 decodes a source address and a target address on the basis of the address map, and sets a chip enable (CE) signal to a source memory module active in the state for reading from the source-side memory or sets the chip enable (CE) signal to a target memory module active in the state for writing to the target memory module. At that time, chip enable (CE) signals to the other memory modules are inactive. The state of reading from the source memory and the state of writing to the target memory are determined by decoding state variables from the state transition circuit 81.

The state transition circuit 81 controls respective circuit blocks on the basis of a state transition diagram shown in FIG. 8, which will be explained later. Input signals to the state transition circuit 81 are a start signal from the exterior and an end signal from the source address generating circuit 82. Output from the state transition circuit 81 is a state variable to the exterior, source address generating circuit 82, target address generating circuit 83 and chip enable (CE) signal generating circuit 84.

FIG. 3 is a timing chart of data transfer, and FIG. 4 is a flow chart showing state transition during data transfer. With reference to FIGS. 3 and 4, operation of the DMA controller during data transfer is explained.

In the initial state 0, the DMA controller is in idling state (step S101). In the source address generating circuit 82 and the target address generating circuit 83, the start address of data transfer and parameters such as the cycle are set. Until an external DMA start signal becomes active, the state 0 is held to be waiting, and the control proceeds to the next state 1 when the DMA start signal becomes active (step S102).

In the state 1, the address for reading out data of the first word is output to the source memory. Data is not read yet here (step S103).

In the state 3, the address for reading out data of the second word is output to the source memory, and the read-out data of the first word is output from the source memory and stored in the data holding register 88 (step S104).

In the state 7, addresses for reading out data are output sequentially to the source memory. On the other hand, input to the target memory are the write address and the data stored in the data holding register 88. Data read out from the source memory is stored in the data holding register 88 (step S105). Before a read end signal from the source address generating circuit 82 to the state transition circuit 81 becomes active, the state 7 is repeated. When the read end signal becomes active, the flow progresses to the state 6 (step S 106).

In the state 6, the address is not input to the source memory, but the final data is read out from the source memory. The address is input to the target memory, and the data of the second final ((n−1)th) from the final ((n)th) stored in the data holding register 88 is input to the target memory. The final data read out from the source memory is stored in the data holding register 88 (step S107).

In the state 4, the final data stored in the data holding register 88 is written in the target memory (step S108). Thereafter, the flow returns to the state 0.

By assigning state variables as explained above, decoding can be simplified as explained below when the state variables are expressed by binary numbers. That is, when the state variable bit0 is 1 (in states 1, 3 and 7), and the address and the chip enable (CE) signal may be input to the source memory, and when bit2 is 1(in states 4, 6 and 7), the address, chip enable (CE) signal and read/write (R/W) signal may be input.

FIG. 5 is a block diagram showing the construction of a source address generating circuit of a conventional DMA controller.

The source address generating circuit of the conventional DMA controller shown in FIG. 5 is configured as follows.

An effective address generator of the source address generating circuit includes a register 101 supplied with a base address (which is the first address in an address region for data to be transferred in the memory as the source of data) or the an increment to the preceding effective address, adder 106 supplied with the increment from the register 101 and the base address or the preceding effective address, and multiplexer 109 supplied with the base address and a result of calculation by the adder 106 to output one of them. A data counter of the source address generating circuit includes a register 104 in which the number of data to be transferred is set, adder 105 for adding the number of data to the prior transferred number of data every time upon transferring one unit of data, multiplexer 108 supplied with a result of calculation by the adder 105 to output the number of post-transfer data (0 when no data is transferred yet) to the register 102, and comparator 107 for comparing the numbers of data output from the registers 102 and 104.

Operations of the source address generating circuit of FIG. 5 are as follows. The base address is input to the register 103 via the multiplexer 109, and the base address of an address of data to be transferred or the increment to the preceding effective address is input to the register 101. Then, the base address or the preceding effective address plus the increment are input in synchronism from the registers 101 and 103 to the adder 106, and their added value is output as the effective address via the multiplexer 109 and the register 103. Additionally, the effective address and the increment is input to the adder 106 to successively output subsequent effecting addresses. The effective addresses are used sequentially to access to the source-side memory.

Further, after the number of data to be transferred is input to the register 104, the adder 105 adds data to the number of data already transferred every time upon transferring one unit of data, and inputs the result to the multiplexer 108. The multiplexer 108 outputs the number of post-transfer data (0 when no data is transferred yet) to the register 102. The number of transfer data set in the register 104 and the number of post-transfer data input to the register 102 are input synchronously to the comparator 107. If comparison in the comparator shows that it does not yet reach the number of transfer data set in the register 104 as a result of comparison by the comparator 107, then data transfer is continued. If the comparison shows that it has reached the number of transfer data set in the register 104, then data transfer is finished.

As explained above, the conventional DMA controller was configured to sequentially access and transfer data to memory modules by using sequentially generated effective addresses by addition of incremental values to the base address and to finish data transfer upon transferring a predetermined number of data.

However, in the conventional DMA controller explained above, since an effective address made by sequentially adding an incremental value to a base address is used for access and data transfer to memory, data that can be transferred each time of transfer was limited to continuous data mapped in a one-dimensional space or data of a certain increment. That is, more complicated data transfer, such as transferring arbitrary rectangular regions of data mapped in a two-dimensional space, needed repeating the operation of data transfer some times.

SUMMARY OF THE INVENTION

It is therefore an object of the invention to provide a DMA controller with a highly functional and generally usable construction, which enables data transfer of a more complicated data region in a single transfer operation.

According to the present invention, there is provided a DMA controller comprising:

address-continuous region transfer end deciding means which determines the end of current data transfer of a region where addresses of data to be transferred are continuous (hereinbelow expressed as the "address-continuous region") contained in an address-continuous region of data to be transferred and outputs an address-continuous region transfer end signal;

address generating means which outputs renewed addresses contained in the address-continuous region for transferring data therefrom sequentially from the leading address, and sequentially effects similar renewal and output of addresses for a plurality of address-continuous regions in response to said address-continuous region transfer end signal; and data transfer end deciding means which determines the end of data transfer of a final address-continuous region among all address-continuous regions contained in the address region of data to be transferred, and outputs a data transfer end signal.

The DMA controller according to the invention enables not only block transfer of a data group of a continuous region or an incremental value in a one-dimensionally mapped address space but also data transfer of any arbitrary data group in a two-dimensionally mapped address space in a single operation of transfer by appropriately selecting predetermined parameters.

DESCRIPTION OF THE PREFERRED EMBODIMENTS

DMA controllers according to the invention enable to program not only block transfer of a data group of a continuous region or a certain incremental value in a one-dimensional mapped address space but also data transfer of a various data group having any arbitrary various positional relations, such as in a rectangular region, in one or more rows, in one or more columns, in diagonal positions, in offset diagonal positions, by appropriately selecting predetermined parameters, namely, the number of rows, cycle, base address, number of row data, etc.

Explained below are DMA controllers embodying the invention with reference to the drawings. DMA controllers embodying the invention are characterized in arrangement of a source address generating circuit and a target address generating circuit. Their general constructions, however, are equivalent to that explained with reference to FIGS. 1 through 4, and explanation is made only on arrangement of the source address generating circuit and the target address generating circuit, omitting explanation on the common portions.

Figure 6:
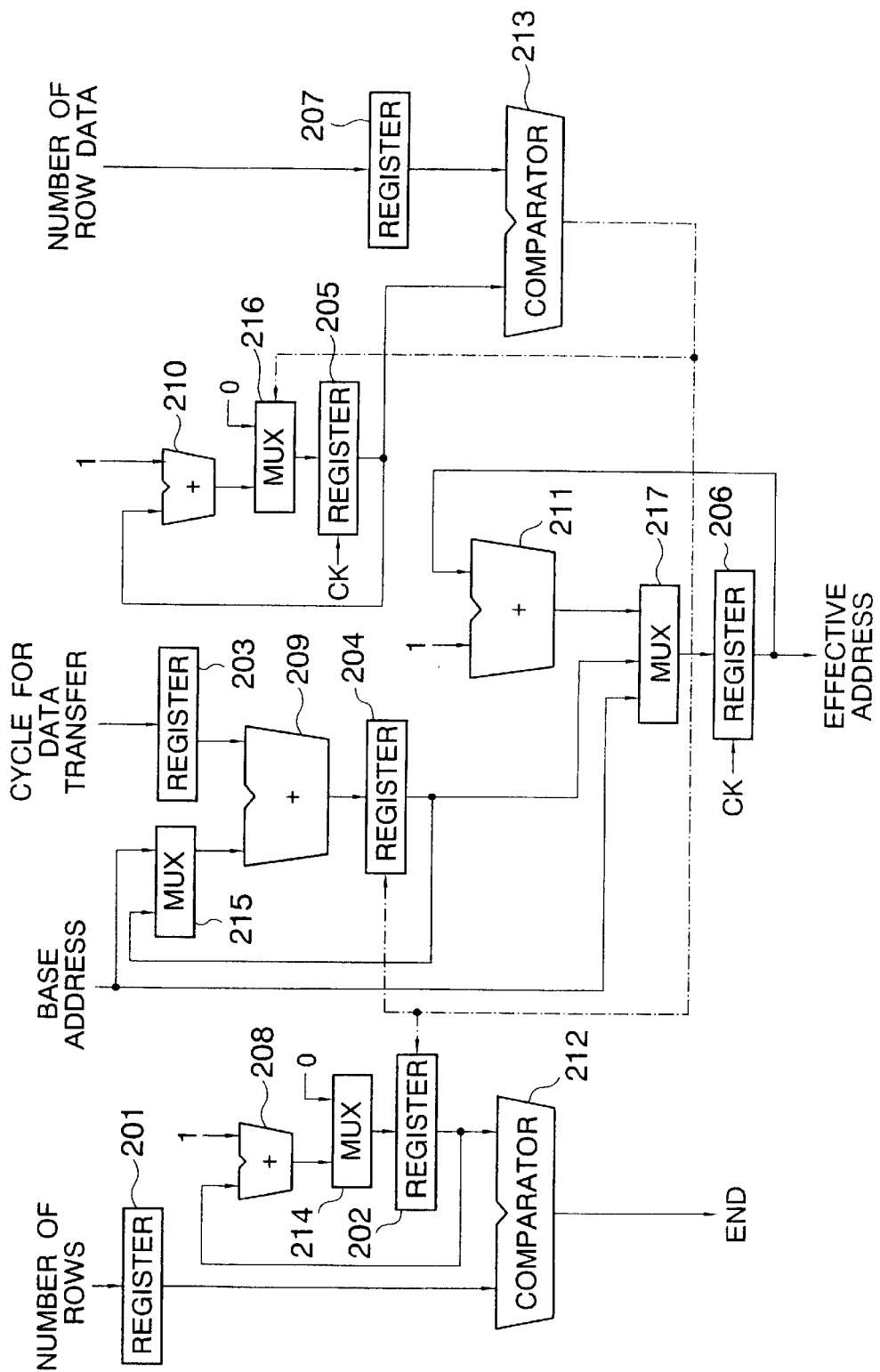
FIG. 6 is a block diagram of a source address generating circuit of a DMA controller according to the first embodiment of the invention.

FIG. 6 is a block diagram of the source address generating circuit of a DMA controller according to the first embodiment of the invention. The source address generating circuit shown here includes three blocks. Since the target address generating circuit has the same arrangement as the source address generating circuit, explanation on its arrangement is omitted.

Assume here that data of any arbitrary rectangular region in a two-dimensionally mapped address space be transferred. The rectangular region can be realized by adding a predetermined incremental value to an effective address used for access to memory every time when a set of data whose addresses are continuous (called a row here) are transferred. While data of a certain row are transferred, the address is incremented sequentially. When the transfer of data of a row is completed, the control proceeds to data transfer of the next row by adding the predetermined incremental value to the address of the final data of the preceding row.

The right- side block of the source address generating circuit in FIG. 6 is a transfer data counter for counting the number of continuous transfer data (number of data of a row). The transfer data counter includes an adder 210 for incrementing the number of data already transferred every time upon transferring one unit of data, multiplexer 216 responsive to the result of calculation of the adder to output the number of transferred data of a row for transferring data (0 when no data is transferred yet), register 205 storing the counted number of transferred data, register 207 storing the number of data within a row to be transferred upon initialization prior to data transfer, and comparator 213 for comparing the number of transferred data stored in the register 205 with the number of data stored in the register 207 to be transferred.

The number of post-transfer data stored in the register 205 is incremented one by one for each cycle of transferring one unit of data after initialized to 0 upon data transfer being started. The comparator 213 compared the number of post-transfer data stored in the register 205 with the number of data to be transferred stored in the register 207, and outputs a row-transfer end signal when both numbers of data coincide.

The central block of the source address generating circuit in FIG. 6 is an address generator for generating addresses. The address generator includes a register 203 storing the cycle of data transfer addresses, namely, the number of data from the leading address of a certain row to the leading address of the next row upon initialization, multiplexer 215 supplied with the leading address of the row of the current transfer (when no data is transferred yet, the base address which is the first address in the address region of data for data transfer in the source-side memory), adder 209 for adding the cycle of data transfer addresses supplied from the register 203 to the leading address of the row under current transfer supplied from the multiplexer 215, register 204 which is set to the base address upon initialization and stores a value sequentially adding the cycle of data transfer addresses to the base address every time it receives the row-transfer end signal from the comparator 213, adder 211 for incrementing supplied addresses, multiplexer 217 supplied with the base address upon initialization or supplied with the addresses sequentially incremented by the adder 211 during data transfer, and register 206 storing addresses of data to be transferred supplied from the multiplexer 217.

When data is transferred, the register 204 always stores the leading address of a row under current transfer whereas the register 206 always stores addresses of data to be transferred. After data transfer is started, addresses of data to be transferred are stored in the register 206 and output therefrom for each clock.

Figure 1:
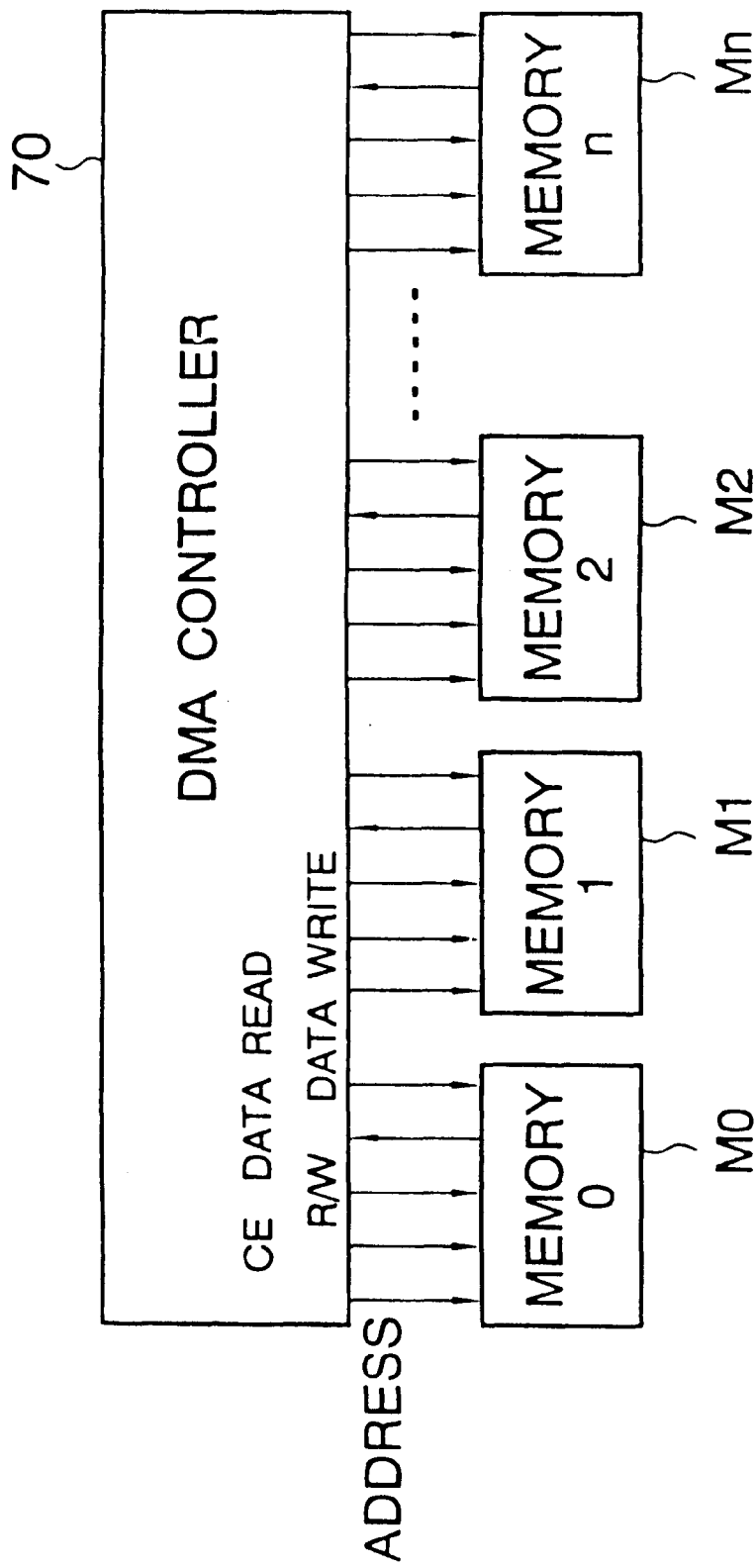
FIG. 1 is a block diagram showing connection between a DMA controller and a plurality of memory modules.
Figure 2:
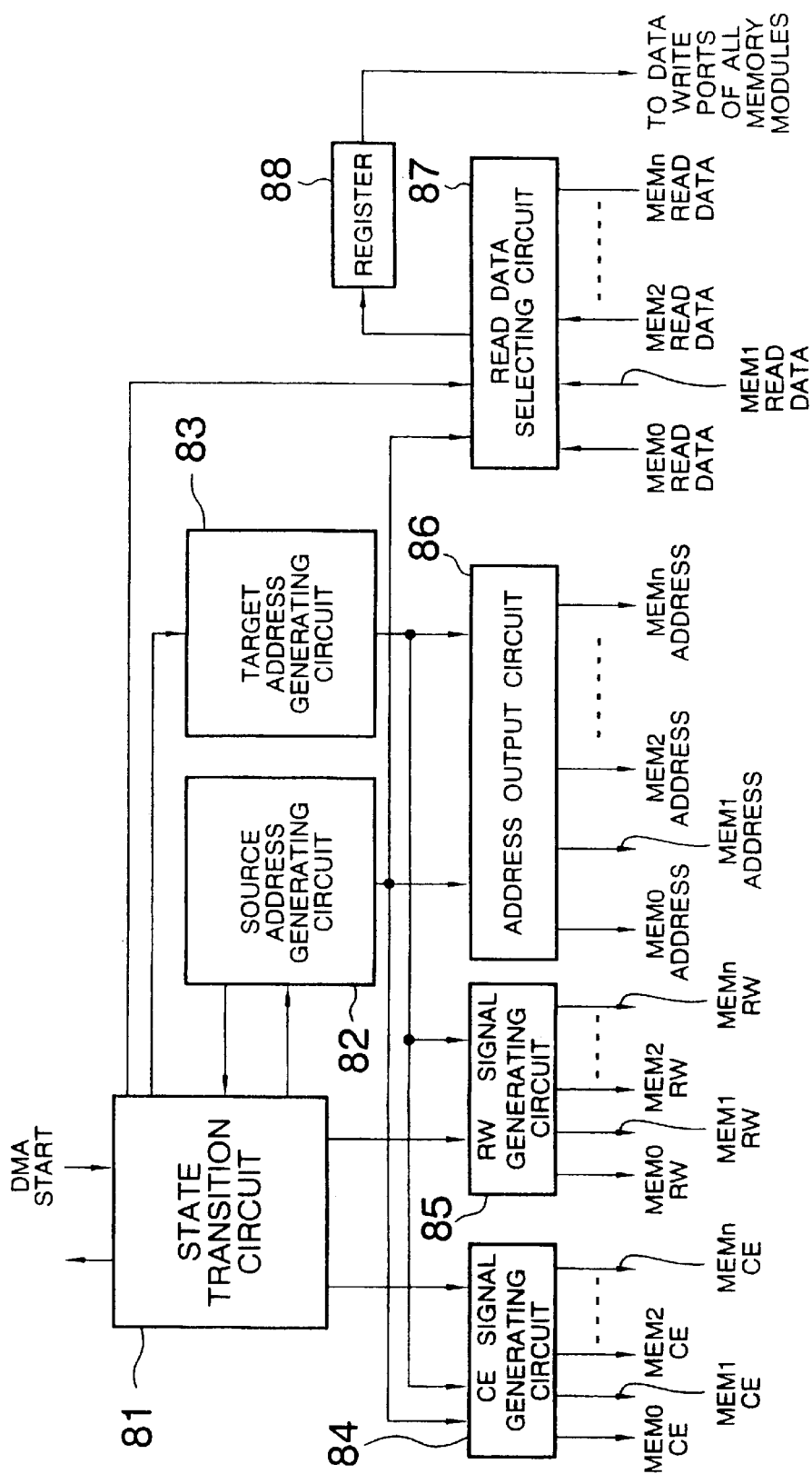
FIG. 2 is a block diagram showing the arrangement of a DMA controller.
Figure 3:
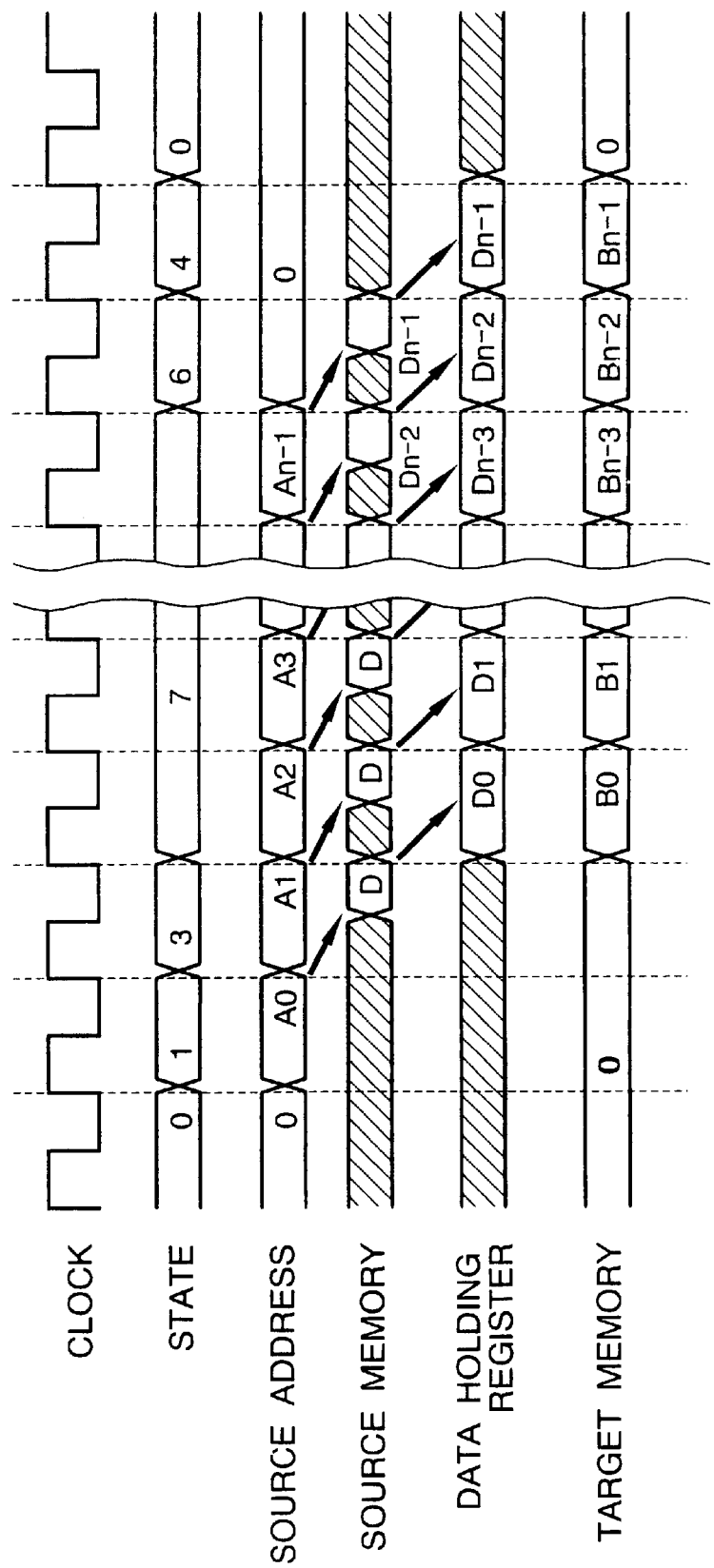
FIG. 3 is a timing chart of data transfer.
Figure 4:
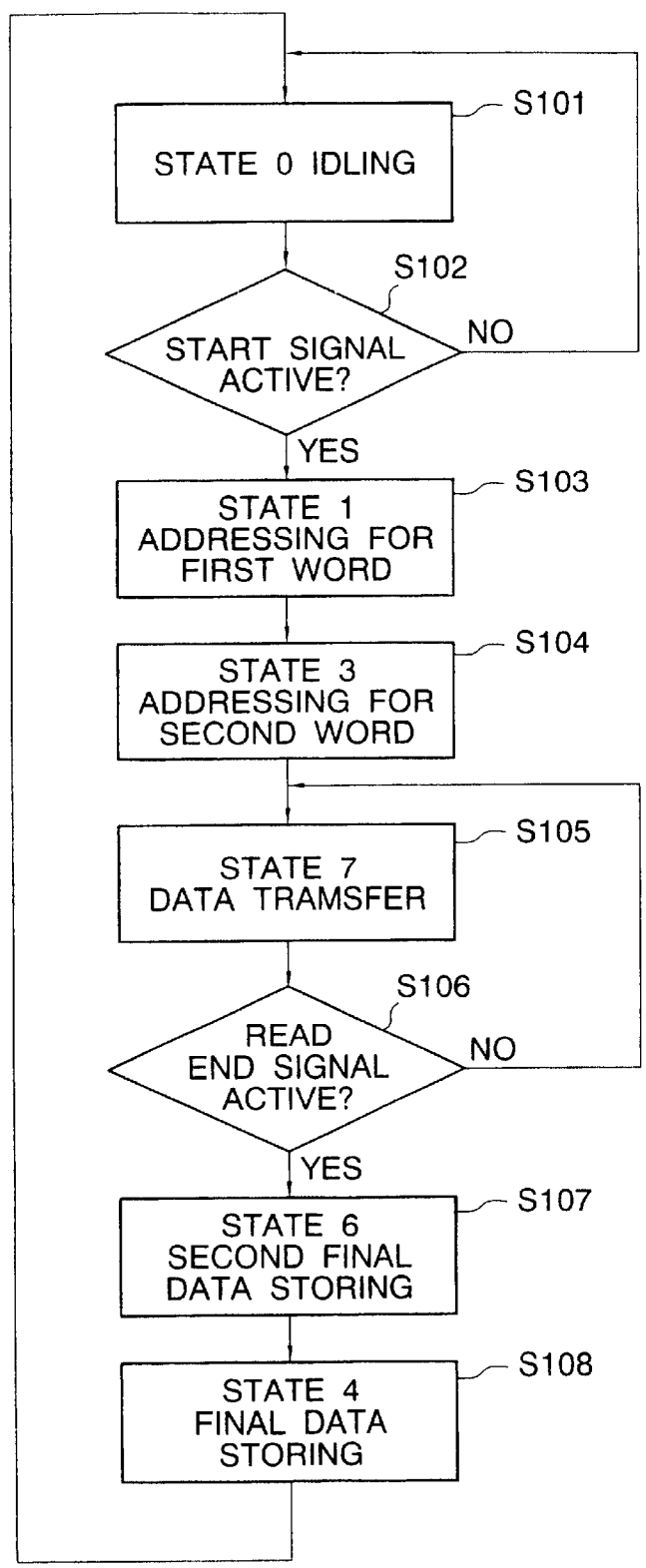
FIG. 4 is a flowchart showing state transition during data transfer.
Figure 5:
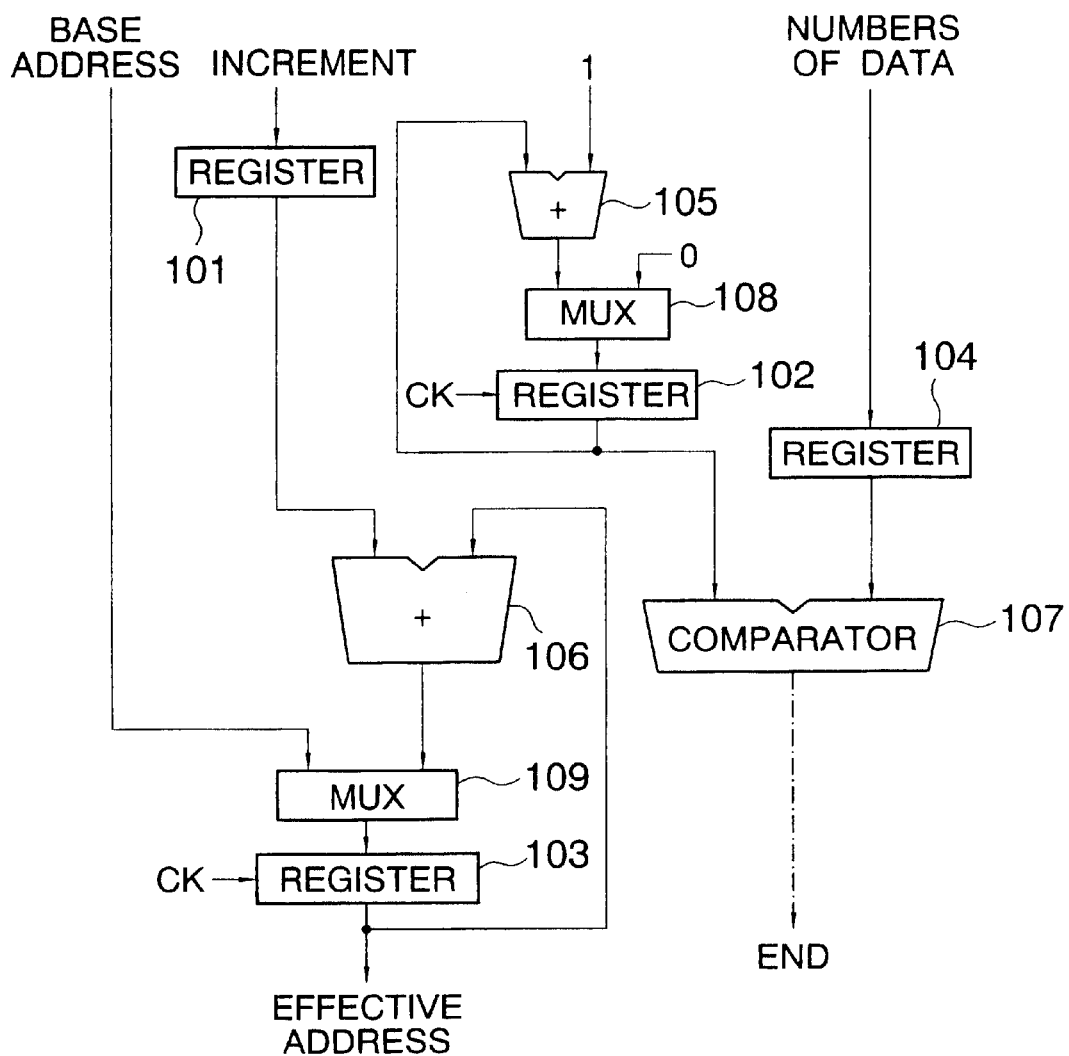
FIG. 5 is a block diagram showing the arrangement of a source address generating circuit in a conventional DMA controller.

The left-side block of the source address generating circuit of FIG. 1 is a transferred row counter for counting the number of rows of data already transferred. The transferred row counter includes a register 201 storing the number of rows of data to be transferred, adder 208 for incrementing the number of transferred data rows, multiplexer 214 for outputting the number of post-transfer data rows (0 when no data is transferred yet), register 202 storing the number of post-transfer data rows, and comparator 212 for comparing the number of data rows to be transferred stored in the register 201 with the number of post-transfer data rows stored in the register 202.

The comparator 212 outputs a transfer end signal when the number of data rows to be transferred coincides with the number of post-transfer data rows. The end of data transfer may be judged either on the part of the source or on the part of the target. Therefore, if the source side has an end judging function, namely, transferred row counter (components of the registers 201, 202, adder 208 and comparator 212), then the target side need not have them.

Figure 7A:
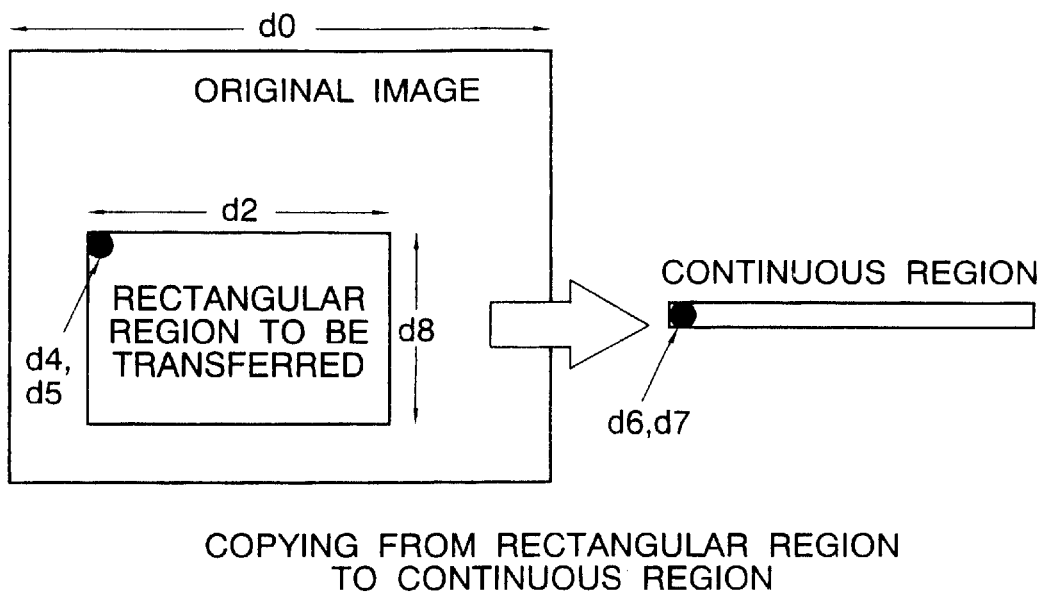
FIGS. 7A and 7B are explanatory views schematically showing an aspect where data is transferred from a rectangular region to a continues region (FIG. 7A or to a rectangular region (FIG. 7B) in a two-dimensionally mapped address space by using a DMA controller according to the invention.
Figure 7B:
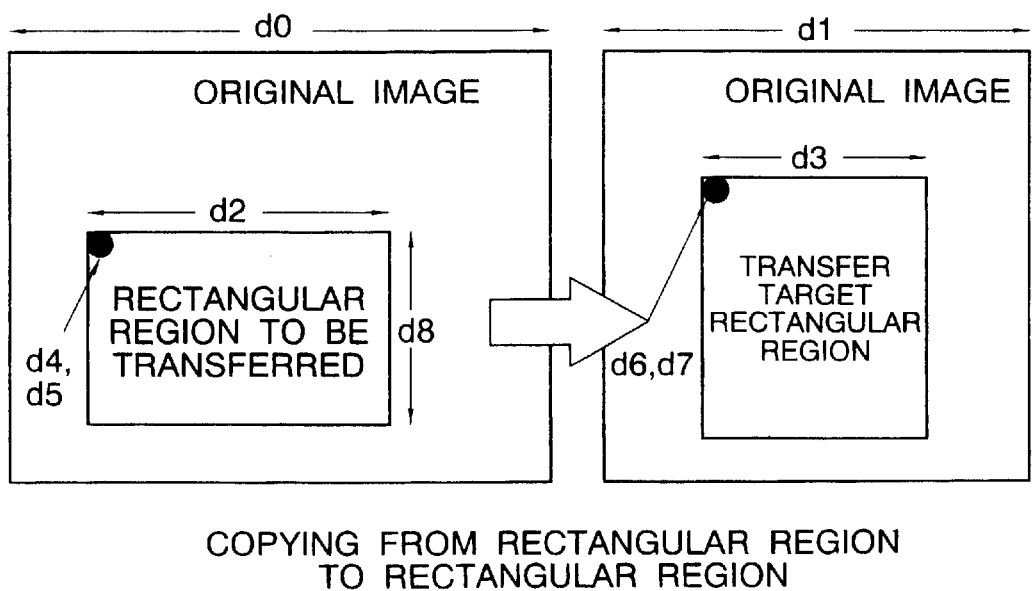

FIGS. 7A and 7B schematically show the aspect of data transfer from a rectangular region in a two-dimensionally mapped address space to a continuous region (FIG. 7A) or to a rectangular region (FIG. 7B) by using the DMA controller according to the invention.

The dimensions d0 to d8 used in FIGS. 7A and 7B are also stored in registers having the same names viewed from the processor, when data transfer as shown in FIGS. 7A and 7B is executed by controlling the DMA controller of the present invention by the processor.

The functions of the registers are now explained. The register numbers accompany their register names in parenthesis.

Register d0 (source period) sets a source period which means a horizontal size of the original image.

Register d1 (target period) sets a target period which means a horizontal size of the original image.

Register d2 (source horizontal size) sets a horizontal size of source rectangular region.

Register d3 (target horizontal size) sets a horizontal size of target rectangular region.

Register d4 (source HI) sets high 16 bits of source start address.

Register d5 (source LO) sets low 16 bits of source start address.

Register d6 (target HI) sets high 16 bits of target start address.

Register d7 (target LO) sets low 16 bits of target start address.

Register d8 (number of data) sets number of rows to be transferred.

As shown in FIGS. 7A, 7B, according to the DMA controller according to the invention, by appropriately setting predetermined parameters, namely, the number of rows, cycle, base address, number of row data, and so on, it is possible to program not only block transfer of a data group of a continuous region or an incremental value in a one-dimensionally mapped address space but also data transfer of a data group with any arbitrary positional relation, such as in a rectangular region, in one or more rows, in one or more columns, in diagonal positions, in offset diagonal positions, etc.

Figure 8:
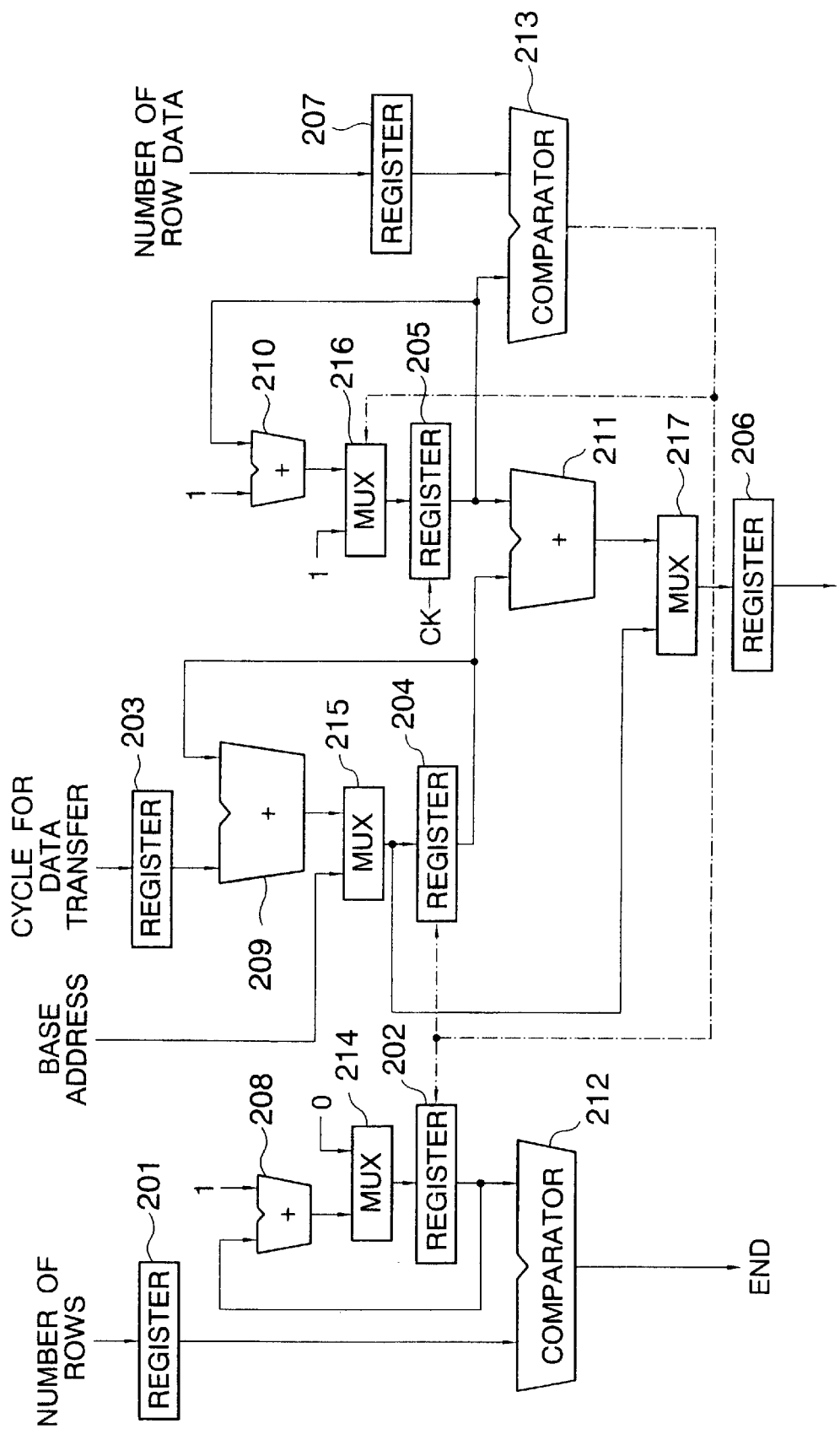
FIG. 8 is a block diagram of a source address generating circuit of a DMA controller according to the second embodiment of the invention.

FIG. 8 is a block diagram of a source address generating circuit of a DMA controller according to the second embodiment of the invention. Similarly to the first embodiment, the source address generating circuit of FIG. 8 includes three blocks. Here again, since its target address generating circuit is the same as the source address generating circuit in construction, explanation on its construction is omitted.

The right-side block of the source address generating circuit of FIG. 8 is a transfer data counter for counting the number of continuous transfer data (number of row data). The transfer data counter includes an adder 210 which increments 1 for the number of data already transferred every time upon transferring one unit of data, multiplexer 216 responsive to the result of calculation by the adder to output the number of data incremented by 1 for the number of post-transfer data of the row for data transfer (1 when no data is transferred yet), register 205 storing the number of data incremented by 1 for the number of post-transfer data of the row for data transfer (the number of post-transfer data at the end of the cycle), register 207 storing the number of data within a row to be transferred upon initialization prior to data transfer, and comparator 213 for comparing the number of post-transfer data at the end of the cycle output from the register 205 with the number of data to be transferred stored in the register 207.

The number of post-transfer data at the end of the cycle stored in the register 205 is incremented by 1 per each cycle of transferring one unit of data after it is initialized to 1 upon the start of data transfer. The comparator 213 compares the number of post-transfer data at the end of the cycle stored in the register 205 with the number of data to be transferred stored in the register 207, and outputs a row transfer end signal when both number of data coincide.

The central block of the source address generating circuit of FIG. 8 is an address generator for generating addresses. The address generator includes a register 203 storing the cycle of data transfer addresses, namely, the number of data from the leading address of a certain low to the leading address of the next row upon initialization, adder 209 for adding the cycle of data transfer addresses input from the register 203 to the leading address of a row currently transferred, multiplexer 215 supplied with the leading address of the currently transferred row (when no data is transferred yet, the base address which is the fist address of an address region of data to be transferred stored in the memory as the source of data transfer) from the adder 209, register 204 in which the base address is set upon initialization, and a value made by sequentially adding the cycle of data transfer addresses to the base address every time is stored every time upon receipt of a row transfer end signal from the comparator 213, adder 211 adding the number of post-transfer data at the end of the cycle from the register 205 to the address from the register 204, multiplexer 217 supplied with the leading address of the next row upon initialization and at the end of row transfer and the address from the adder 211, namely, address of data to be transferred, and register 206 storing and outputting the address of data to be transferred from the multiplexer 217 one clock later than each start of transfer.

When data transfer is effected, the register 204 always stores the leading address of a row currently transferred whereas the register 206 always stores the address of data to be transferred. After the data transfer is started, the address of data to be transferred is stored in and output from the register 206 for each clock.

The left-side block of the source address generating circuit of FIG. 8 is a transfer row counter for counting the number of rows of transferred data. The transfer row counter has the same construction as that of the first embodiment. That is, it includes a register 201 storing the number of rows of data to be transferred, adder 208 incrementing the number of rows of transferred data, multiplexer 214 outputting the number of rows of post-transfer data (when no data is transferred yet, 0), register 202 storing the number of rows of post-transfer data, and comparator 212 for comparing the number of rows of data to be transferred stored in the register 201 with the number of rows of post-transfer data stored in the register 202.

The comparator 212 outputs a transfer end signal when the number of rows of post-transfer data coincides with the number of rows of data to be transferred. The decision of the end of data transfer may be done either on the source side or the target side. Therefore, if the source side includes an end decision function, namely, the transfer row counter (components of registers 201, 202, adder 208 and comparator 212), then the target side does not need them.

Figure 9:
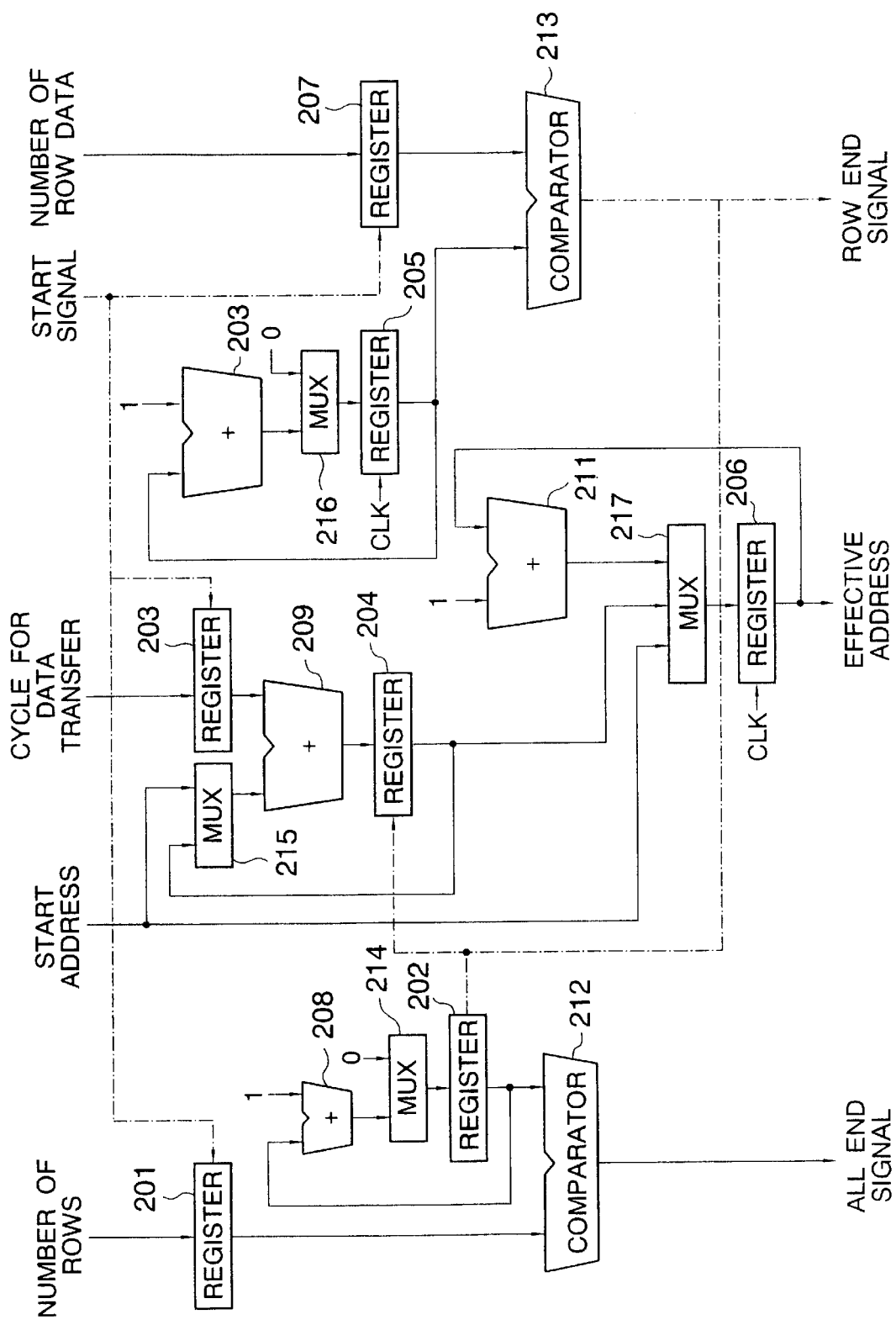
FIG. 9 is a block diagram of a source address generating circuit of a DMA controller according to the third embodiment of the invention.

FIG. 9 is a block diagram of a source address generating circuit of a DMA controller according to the third embodiment of the invention. This embodiment solves the problem that in case of accessing a memory (external memory) connected to a bus and data length is long, there occurs a situation where other module can not use the bus for a long time due to the long time occupation of the bus.

For this purpose, according to the third embodiment, a two dimensional transfer is divided into row unit transfers, and at every completion of the row transfer, acknowledgement of accessing to the external memory is obtained.

The source address generating circuit shown in FIG. 9 has a similar construction as disclosed in FIG. 6 and explanations on corresponding elements are omitted.

Differences between them are that registers 201, 203 and 207 are controlled by a start signal, that the multiplexer 216 is not controlled by the output of the comparator 213, that the output of the comparator 213 is defined as a row end signal and provided to registers 202 and 204, that a start address is provided to the multiplexers 215 and 217 instead of the base address, and that the output of the comparator 212 is defined as all end signal.

Figure 10:
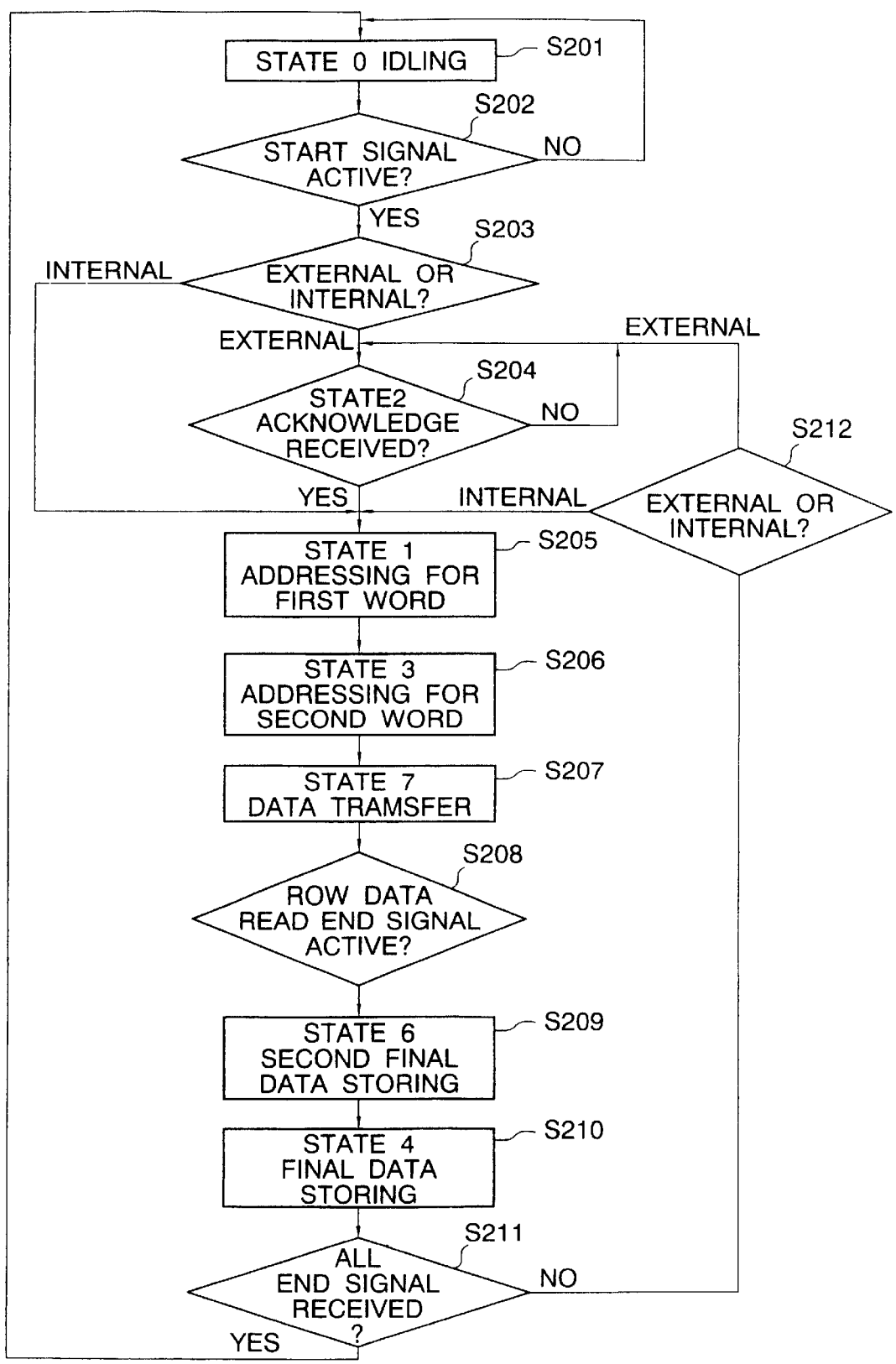
FIG. 10 is a flowchart showing state transition during data transfer.

FIG. 10 is a flowchart showing state transition during data transfer.

In the initial state 0, the DMA controller is in an idling state (step S201). During this state, in source and target address generating circuit, the start address of data transfer and parameters such as cycle of data transfers, are always set for each clock signal until an external DMA start signal becomes active (step S202).

When the DMA start signal becomes active, and either one of the source and target is an external memory, the control proceeds to state 2. Alternatively, if the DMA start signal is made active and both of source and target are internal memories, the control proceeds to state 1 (step S203).

In the state 2, an access request is generated to the external memory, and the state 2 is maintained to wait the answering acknowledgement. If the acknowledgement is received, the process proceeds to state 1 (step S204).

In the state 1, an address for reading out data of a first word is output to the source memory, but no data is read out yet at this step (step S205)

In the next state 3, an address for reading out data of a second word is output to the source memory. Then the reading out data of the first word is output from the source memory and is stored in the data holding register (step S206).

In the next state 7, the reading out data is input to the source memory, and a writing in address and data stored in the data holding register are output and written in the target memory. Data read out from the source memory is stored in the data holding register (step S207).

When row data read out completion signal becomes active, the process proceeds to state 6 (step S208).

In the state 6, no address is input to the source memory, but the last data is read out from the source memory. An address is input to the target memory, then data stored in the data holding register is input to the target memory. Furthermore, the last data read out from the source memory is stored in the data holding register (step S209).

In the state 4, the last data stored in the data holding register is written in the target memory. If the all end signal is ascertained, the process is returned to state 0 (step S2 10). Otherwise, if the external memory is accessed, the process is returned to the state 2, and if the internal memory is accessed, the process is returned to state 1 (steps 211 and 212).

As described above, the DMA controller according to the invention includes an address-continuous region transfer end deciding means which determines the end of current data transfer of a region in which addresses of data to be transferred are continuous (hereinbelow called the "address-continuous region") among data in the address-continuous region to be transferred, and outputs an address-continuous region transfer end signal; an address generator for sequentially outputting addresses contained in the address-continuous region for transferring data therefrom sequentially from the leading address and for sequentially renewing and outputting addresses similarly for a plurality of address-continuous regions in response to the address-continuous region transfer end signal; and a data transfer end deciding means for determining the data transfer end in the final address-continuous region among all address-continuous regions contained in the address region of data to be transferred and for outputting a data transfer end signal. Therefore, by appropriately setting predetermined parameters, it can perform in a single transfer operation not only block transfer of a data group of a continuous region or a certain incremental value in a one-dimensionally mapped address space but also data transfer of a data group in any arbitrary two-dimensionally mapped address space.

What is claimed is:

1. A DMA controller comprising:

address-continuous region data number hold means for holding the number of data of each region where addresses of data to be transferred are continuous (hereinbelow expressed as the "address-continuous region") and for outputting an address-continuous region transfer end signal;

data number counting means for renewing the number of already transferred data in an address-continuous region under current data transfer every time upon transferring data;

data number comparing means for comparing the number of data held in said address-continuous region data number hold means with the number of data renewed by said data number counting means, and for outputting an address-continuous region transfer end signal when they coincide;

address cycle hold means for holding the cycle of addresses which is the number of data from the leading address of an address-continuous region to the leading address of the next address-continuous region;

base address hold means for holding a base address which is the first address in an address region of data to be transferred;

leading address hold means for holding said address or a leading address which is made by sequentially adding said cycle of addresses to said base address in response to said address-continuous region transfer end signal;

address renewal means for sequentially incrementing said base address or leading address held in said leading address hold means every time upon transferring data;

address-continuous region hold means for holding the r number of address-continuous regions for transferring data therefrom;

address-continuous region counting means for renewing the number of address-continuous regions already transferred in response to said address-continuous region transfer end signal; and address-continuous region comparing means for comparing the number of address-continuous regions held in said address-continuous region hold means with the number of address-continuous regions renewed by said address-continuous region counting means.

2. A DMA controller comprising:

a first register for holding the number of data per each region where addresses of data to be transferred are continuous (hereinbelow called the "address-continuous region");

a first register for sequentially incrementing the number of already transferred data in an address-continuous region under current data transfer every time upon transferring data;

a first multiplexer for selectively outputting said number of already transferred data or 0 when no data of an address-continuous region is transferred yet;

a second register for holding the number of data output from said first multiplexer and for outputting it at a predetermined timing;

a first comparator for comparing the number of data held in said first register with the number of data output from said second register, and for outputting an address-continuous region transfer end signal when they coincide;

a third register for holding the cycle of addresses which is the number of data from the leading address of an address-continuous region to the leading address of the next address-continuous region;

a second multiplexer for selectively outputting a base address which is the first address in an address-region of data to be transferred when no data is transferred yet, or the leading address made by sequentially adding said cycle of addresses to said base address;

a second adder for adding said cycle of addresses to said base address or said leading address output from said second multiplexer to sequentially renew the leading address;

a fourth register for holding the leading address renewed by said second adder and for outputting it in response to said address-continuous region transfer end signal;

a third adder for sequentially incrementing said base address or the leading address renewed by said second adder every time upon transferring data;

a third multiplexer for selectively outputting said base address, said leading address renewed by said second adder, or said address sequentially incremented by said third adder;

a fifth register for holding the address output from said third multiplexer and for outputting it at a predetermined timing;

a sixth register for holding the number of address-continuous regions for transferring data therefrom;

a fourth adder for sequentially incrementing the number of address-continuous regions already transferred in response to said address-continuous region transfer end signal;

a fourth multiplexer for selectively outputting the number of already transferred address-continuous regions sequentially incremented by sad fourth adder or 0 when no data is transferred yet;

a seventh register for holding the number of address-continuous regions output from said fourth multiplexer and for outputting it in response to said address-continuous region transfer end signal; and a second comparator for comparing the number of address-continuous regions held in said sixth register with the number of address-continuous regions output from said seventh register, and for outputting a data transfer end signal when they coincide.

3. A DMA controller comprising:

a first register for holding the number of data per each region where addresses of data to be transferred are continuous hereinbelow called the "address-continuous region");

a first adder for sequenly incrementing the number of data already transferred in an address-continuous region under current data transfer every time upon transferring data;

a first multiplexer for selectively outputting said number of already transferred data or 1 at the start of data transfer of an address-continuous region;

a second register for holding the number of data output from said first multiplexer and for outputting it at a predetermined timing;

a first comparator for comparing the number of data held in said first register with the number of data output from said second register, and for outputting an address-continuous region transfer end signal when they coincide;

a third register for holding the cycle of addresses which is the number of data from the leading address of an address-continuous region to the leading address of the next address-continuous region;

a second adder for adding said cycle of addresses to the leading address to sequentially renew the leading address;

a second multiplexer for selectively outputting a base address which is the first address in an address region of data to be transferred when no data is transferred yet, or the leading address renewed by said second adder;

a fourth register for holding said base address or said leading address output from said second multiplexer and for outputting it in response to said address-continuous region transfer end signal;

a third adder for adding the number of data output from said second register to said base address or said leading address output from said fourth register to renew the address every time upon transferring data;

a third multiplexer for selectively outputting said base address, said leading address renewed by said second adder, or said address renewed by said third adder;

a fifth register for holding the address output from said third multiplexer and for outputting it at a predetermined timing;

a sixth register for holding the number of address-continuous regions for transferring data therefrom;

a fourth adder for sequentially incrementing the number of address-continuous regions already transferred in response to said address-continuous region transfer end signal;

a fourth multiplexer for selectively outputting the number of already transferred address-continuous regions sequentially incremented by said fourth adder, or 0 when no data is transferred yet;

a seventh register for holding the number of address-continuous regions output from said fourth multiplexer and for outputting it in response to said address-continuous region transfer end signal; and a second comparator for comparing the number of address-continuous region held in said sixth register with the number of address-continuous regions output from said seventh register, and for outputting a data transfer end signal when they coincide.

* * * * *